(12) United States Patent
Ota et al.

(10) Patent No.: US 11,873,879 B2
(45) Date of Patent: Jan. 16, 2024

(54) FLEXIBLE FLYWHEEL (71) Applicant: AISIN TAKAOKA CO., LTD., Toyota (JP)

(72) Inventors: Tsuyoshi Ota, Toyota (JP); Akira Sato, Toyota (JP)

(73) Assignee: AISIN TAKAOKA CO., LTD., Toyota (JP)

( * ) Notice: Subject to any disclaimer, the term of this patent is extended or adjusted under 35 U.S.C. 154(b) by 182 days.

(21) Appl. No.: 17/429,224

(22) PCT Filed: Mar. 11, 2020

(86) PCT No.: PCT/JP2020/010544
§ 371 (c)(1),
(2) Date: Aug. 6, 2021

(87) PCT Pub. No.: WO2020/195833
PCT Pub. Date: Oct. 1, 2020

(65) Prior Publication Data
US 2022/0010859 A1 Jan. 13, 2022

(30) Foreign Application Priority Data
Mar. 25, 2019 (JP) ................................ 2019-056923

(51) Int. Cl.
*F16F 15/30* (2006.01)
*F16F 15/10* (2006.01)
(Continued)

(52) U.S. Cl.
CPC ........ *F16F 15/3153* (2013.01); *F16F 15/121* (2013.01); *F16F 2222/08* (2013.01);
(Continued)

(58) Field of Classification Search
CPC ........ F16F 15/121; F16F 15/30; F16F 15/315; F16F 15/3153; F16F 2222/08; F16F 2230/36; F16F 2232/02; F16F 2236/08
See application file for complete search history.

(56) References Cited

U.S. PATENT DOCUMENTS 670,388 A * 3/1901 Howland-Sherman ..................... F16F 15/30
74/572.21
3,387,505 A 6/1968 Rumsey
(Continued)

FOREIGN PATENT DOCUMENTS

CN 1134184 A 10/1996
CN 108050204 A * 5/2018 ............ F16F 15/315
(Continued)

OTHER PUBLICATIONS

Machine translation of FR 2890716 A1 obtained on Mar. 9, 2023.*
(Continued)

*Primary Examiner* — Adam D Rogers
(74) *Attorney, Agent, or Firm* — BUCHANAN INGERSOLL & ROONEY PC (57) ABSTRACT

A flexible flywheel includes: a shaft fastening portion fixed to an end portion of an engine crankshaft; an annular inertia ring provided around the shaft fastening portion; a plurality of elastic spoke portions which extend in the radial direction between the shaft fastening portion and the inertia ring and connect the shaft fastening part and the inertia ring to each other, and that absorb vibration acting on the crankshaft by undergoing deflection; and weight portions provided between adjacent ones of the elastic spoke portions. The fastening portion, inertial ring, elastic spoke portions, and weight portions are formed integrally by casting or forging.

8 Claims, 7 Drawing Sheets

(51) Int. Cl.
*F16F 15/315* (2006.01)
*F16F 15/121* (2006.01)

(52) U.S. Cl.
CPC ....... *F16F 2230/36* (2013.01); *F16F 2232/02* (2013.01); *F16F 2236/08* (2013.01)

(56) References Cited

U.S. PATENT DOCUMENTS

| | | | |
|---|---|---|---|
| 3,462,136 A | 8/1969 | Rumsey | |
| 5,890,398 A * | 4/1999 | Matsuno | F16H 45/02 403/337 |
| 6,041,678 A | 3/2000 | Cooke et al. | |
| 6,216,327 B1 * | 4/2001 | Hendrian | F16F 15/126 29/278 |
| 6,440,044 B1 * | 8/2002 | Francis | A63B 21/4043 482/137 |
| 8,590,683 B2 * | 11/2013 | Tsukamoto | F16H 41/24 60/330 |
| 8,714,051 B2 * | 5/2014 | Dopke | F16F 15/315 123/192.1 |
| 2017/0102048 A1 * | 4/2017 | Guarracino | F16F 15/30 |
| 2022/0003292 A1 * | 1/2022 | Baldoni | F16F 1/027 |
| 2023/0093442 A1 * | 3/2023 | Ota | F16F 15/30 |

FOREIGN PATENT DOCUMENTS

| | | | | |
|---|---|---|---|---|
| CN | 108708934 A | | 10/2018 | |
| CN | 109083979 A | | 12/2018 | |
| CN | 109210144 A | * | 1/2019 | .......... F16F 15/3153 |
| DE | 1 233 215 B | | 1/1996 | |
| DE | 10 2011 017 397 A1 | | 11/2011 | |
| DE | 10 2016 207 100 A1 | | 11/2017 | |
| DE | 10 2019 101 983 A1 | | 7/2020 | |
| FR | 2849683 A1 | * | 7/2004 | ............... F16D 3/60 |
| FR | 2890716 A1 | * | 3/2007 | .......... F16F 15/1201 |
| JP | S54109584 A | | 8/1979 | |
| JP | S5758542 B2 | | 12/1982 | |
| JP | S60177350 U | | 11/1985 | |
| JP | H0712646 U | | 3/1995 | |
| JP | H08-068450 A | | 3/1996 | |
| JP | H11182631 A | | 7/1999 | |
| JP | 2004074230 A | | 3/2004 | |
| JP | 2008-527231 A | | 7/2008 | |
| KR | 200199530 Y1 | | 10/2000 | |
| WO | WO-2006072752 A1 | * | 7/2006 | .......... F16F 15/1315 |
| WO | WO-2009083469 A1 | * | 7/2009 | .......... F16F 15/1201 |
| WO | 2017/035515 A1 | | 3/2017 | |
| WO | WO-2021166685 A1 | * | 8/2021 | |

OTHER PUBLICATIONS

Office Action (Notice of Reasons for Refusal) dated Dec. 21, 2021, by the Japanese Patent Office in corresponding Japanese Patent Application No. 2021-509003 and an English Translation of the Office Action. (6 pages).

International Search Report (PCT/ISA/210) with translation and Written Opinion (PCT/ISA/237) dated Jun. 2, 2020, by the Japan Patent Office as the International Searching Authority for International Application No. PCT/JP2020/010544. (10 pages).

Notification Concerning Transmittal of International Preliminary Report on Patentability (Form PCT/IB/326 and PCT/IB/373) and the Written Opinion of the International Searching Authority (Form PCT/ISA/237) dated Oct. 7, 2021, by the International Bureau of WIPO in corresponding International Application No. PCT/JP2020/010544. (6 pages).

Notification of Transmittal of Translation of the International Preliminary Report on Patentability (Form PCT/IB/338 and PCT/IB/373) and the Translation of the Written Opinion of the International Searching Authority (Form PCT/ISA/237) dated Oct. 7, 2021, by the International Bureau of WIPO in corresponding International Application No. PCT/JP2020/010544. (7 pages).

Office Action (The First Office Action) dated Jun. 29, 2022, by the State Intellectual Property Office of People's Republic of China in corresponding Chinese Patent Application No. 202080016951.1 and an English Translation of the Office Action. (15 pages).

Office Action dated Aug. 3, 2023, by the German Patent Office in corresponding German Patent Application No. 11 2020 001 446.0 and an English translation of the Office Action. (11 pages).

* cited by examiner

FLEXIBLE FLYWHEEL

CROSS REFERENCE TO RELATED APPLICATION

This international patent application claims priority from Japanese Patent Application No. 2019-56923 filed with the Japanese Patent Office on Mar. 25, 2019, and the entire contents of Japanese Patent Application No. 2019-56923 are incorporated by reference in this international application.

TECHNICAL FIELD

The present disclosure relates to a flexible flywheel.

BACKGROUND ART

In general, in a rotating machine such as an internal combustion engine of a vehicle, a flywheel is attached to one end of a crankshaft. The flywheel has an annular inertia ring, thereby having a relatively large moment of inertia. By virtue of the moment of inertia, rotational energy produced as a result of rotational motion of the crankshaft is stored. Since the flywheel is attached to the crankshaft, stable rotational motion of the crankshaft is attained.

A flexible flywheel, which is one type of flywheel, has been known. The flexible flywheel has a function of absorbing vibrations acting on the crankshaft in addition to the above-described function of storing rotational energy by virtue of moment of inertia. In order to attain such a function, the flexible flywheel has an elastic disk. The elastic disk is fixed to the crankshaft, and absorbs and reduces vibrations through elastic deformation. The inertia ring is provided at a circumferential edge portion of the elastic disk. The elastic disk and the inertia ring are fastened together by, for example, bolts, thereby being integrated (see, for example, PTL 1).

CITATION LIST

Patent Literature

[PTL 1]
Japanese Patent Application Laid-Open (kokai) No. 11-182631

SUMMARY OF INVENTION

Technical Problem

In the conventional flexible flywheel, the elastic disk and the inertia ring are separate components. Therefore, the number of components is large. Also, since an operation of fastening the two components together is needed, the conventional flexible flywheel has a problem of high production cost.

An object of the present disclosure is to reduce production cost while maintaining the function of absorbing and reducing vibrations acting on a shaft.

Means for Solving the Problems

In order to solve the above-described problem, a flexible flywheel of a first disclosure includes:
a shaft fastening portion which is fixed to an end portion of a shaft of a rotating machine;
an annular inertia ring provided around the shaft fastening portion;
a plurality of elastic spoke portions that extend in the radial direction between the shaft fastening portion and the inertia ring and connect the shaft fastening portion and the inertia ring to each other, the elastic spoke portions absorbing a vibration acting on the shaft by undergoing deflection; and
a weight portion provided between adjacent ones of the elastic spoke portions, the weight portion being connected to one of the shaft fastening portion and the inertia ring and being spaced from the other of the shaft fastening portion and the inertia ring,
wherein the shaft fastening portion, the inertia ring, the elastic spoke portions, and the weight portions are integrally formed by casting or forging.

In a flexible flywheel of a second disclosure,
imaginary lines passing through widthwise centers of the elastic spokes are assumed;
the weight portion is provided on extension line of one of the imaginary lines; and
the shaft fastening portion is sandwiched between each of the elastic spoke portions and a corresponding one of the weight portions.

In a flexible flywheel of a third disclosure,
the weight portions are provided on opposite sides of each elastic spoke portion in a circumferential direction, and the weight portions on the opposite sides are line-symmetrical with respect to an imaginary line passing through a widthwise center of the elastic spoke portion and have the same shape.

In a flexible flywheel of a fourth disclosure,
at least side edges in a circumferential direction of connecting portions of the elastic spoke portions for connection to the shaft fastening portion or side edges in a circumferential direction of connecting portions of the elastic spoke portions for connection to the inertia ring are formed to have a rounded shape.

In a flexible flywheel of a fifth disclosure,
side edges in a circumferential direction of connecting portions of the weight portions for connection to the shaft fastening portion or the inertia ring are formed to have a concave rounded shape.

In a flexible flywheel of a sixth disclosure,
each elastic spoke portion has a through hole penetrating the elastic spoke portion in the thickness direction.

In a flexible flywheel of a seventh disclosure,
the through hole is an elongated hole that extends along a direction in which the elastic spoke portion extends;
one end portion of the elongated hole in the direction is located near the shaft fastening portion, and the other end portion of the elongated hole in the direction is located near the inertia ring; and
an inner edge of at least one of the one end portion and the other end portion is formed to have a rounded shape.

Effects of the Invention

According to the first disclosure, when a vibration occurs in the shaft of the rotating machine, that vibration is absorbed by deflection of the elastic spoke portions. Also, when the shaft vibrates, the weight portions are shaken by the vibration. Therefore, the vibration of the shaft is also absorbed by the shaking of the weight portions. As a result, the vibration of the shaft can be attenuated by both the elastic spoke portions and the weight portions.

Unlike the conventional flexible flywheel, the elastic spoke portions and the weight portions provided for vibration absorption are integrally formed by casting or forging together with the shaft fastening portion and the inertia ring. Therefore, the flexible flywheel is composed of a single component, and a fastening operation of uniting a plurality of components is unnecessary. Thus, it is possible to enhance the vibration attenuation effect while reducing production cost.

According to the second and third disclosures, the vibration acting on the shaft are absorbed on opposite sides of the shaft by the elastic spoke portions and the weight portions. As a result, the effect of attenuating the vibration of the shaft can be enhanced.

According to the fourth disclosure, stresses acting on the connecting portions connected to the shaft fastening portion or the inertia ring when the elastic spoke portions deflect for vibration absorption are mitigated because the connecting portions have a rounded shape. As a result, it is possible to reduce the possibility that stresses concentrate on the connecting portions and cracks are generated.

According to the fifth disclosure, the connecting portions of the weight portions are formed to have a concave rounded shape so that the weight portions have narrow portions. Therefore, the weight portions vibrate easily. Also, stresses acting on the connecting portions when the weight portions deflect for vibration absorption are mitigated because the side edges of the connecting portions have a rounded shape. As a result, it is possible to reduce the possibility that stresses concentrate on the connecting portions and cracks are generated.

According to the sixth disclosure, a through hole is provided in each elastic spoke portion. Therefore, as compared with an elastic spoke portion having no through hole, the weight and planar stiffness of the elastic spoke portion can be reduced. As a result, the elastic spoke portions can deflect more easily, whereby the effect of attenuating the vibration of the shaft can be enhanced.

According to the seventh disclosure, an elongated hole is formed in each elastic spoke portion. Therefore, the degree of reduction of the weight and planar stiffness of each elastic spoke portion can be increased, so that the elastic spoke portions can deflect more easily, whereby the vibration absorption performance is enhanced. In addition, stress acting on the vicinities of the shaft fastening portion and the inertia ring when the elastic spoke portions deflect can be mitigated by the rounded inner edges of the end portions of the elongated hole.

BRIEF DESCRIPTION OF THE DRAWINGS

Other objects, other features, and attendant advantages of the present disclosure will be readily appreciated from the following description which is made with reference to the accompanying drawings.

DESCRIPTION OF EMBODIMENT

One embodiment in which the present disclosure is embodied will be described with reference to the drawings. In the present embodiment, an internal combustion engine (engine) of a vehicle is assumed to be a rotating machine, and a flexible flywheel which is attached to a crankshaft of the engine will be described.

Figure 1:
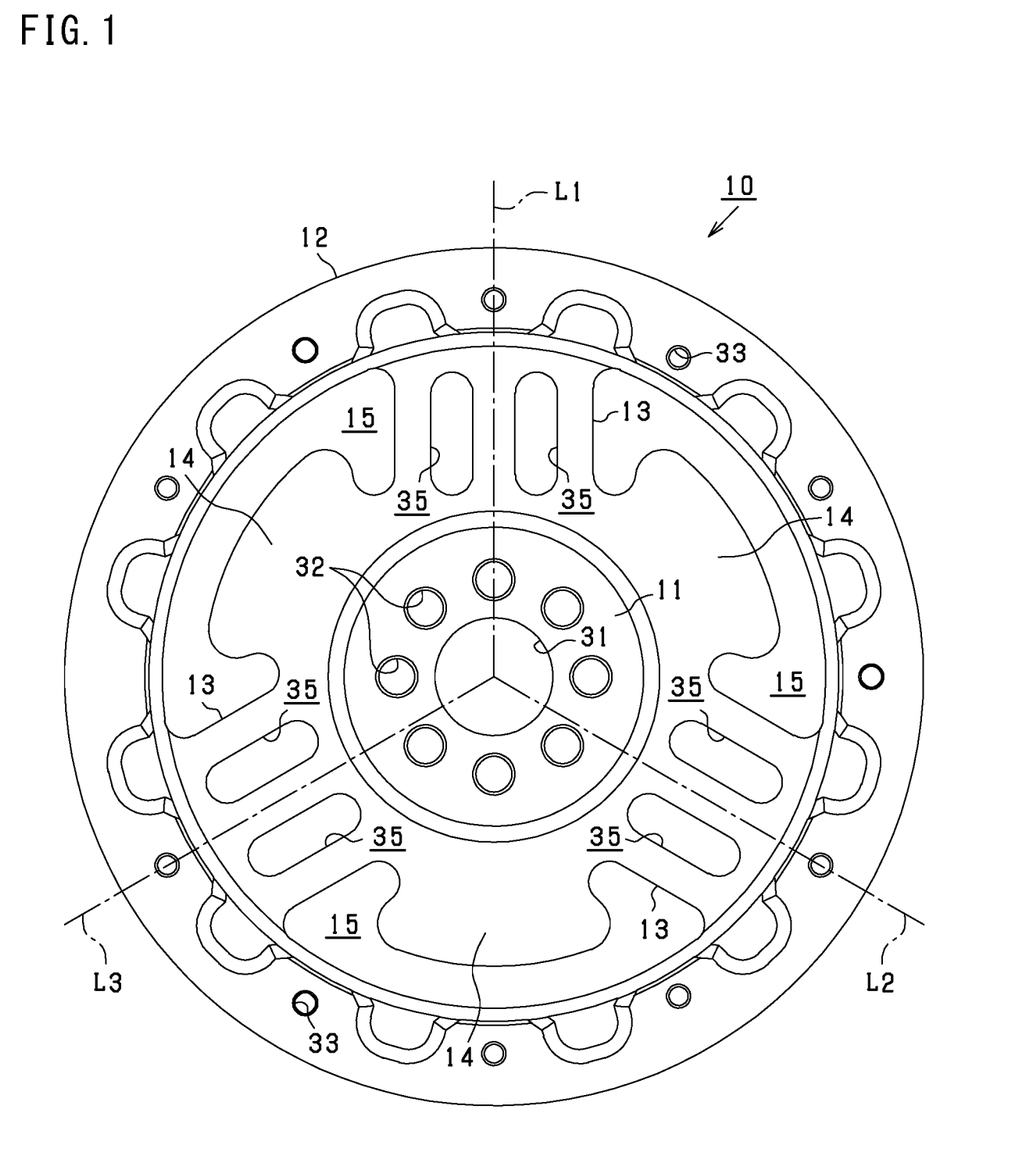
FIG. 1 is a front view of a flexible flywheel.

As shown in FIG. 1, the flexible flywheel 10 has a circular shape as a whole. The flexible flywheel 10 has a shaft fastening portion 11, an inertia ring 12, elastic spoke portions 13, and weight portions 14. The shaft fastening portion 11, the inertia ring 12, the elastic spoke portions 13, and the weight portions 14 are integrally formed, as a cast product, by casting cast iron or the like.

Figure 3:
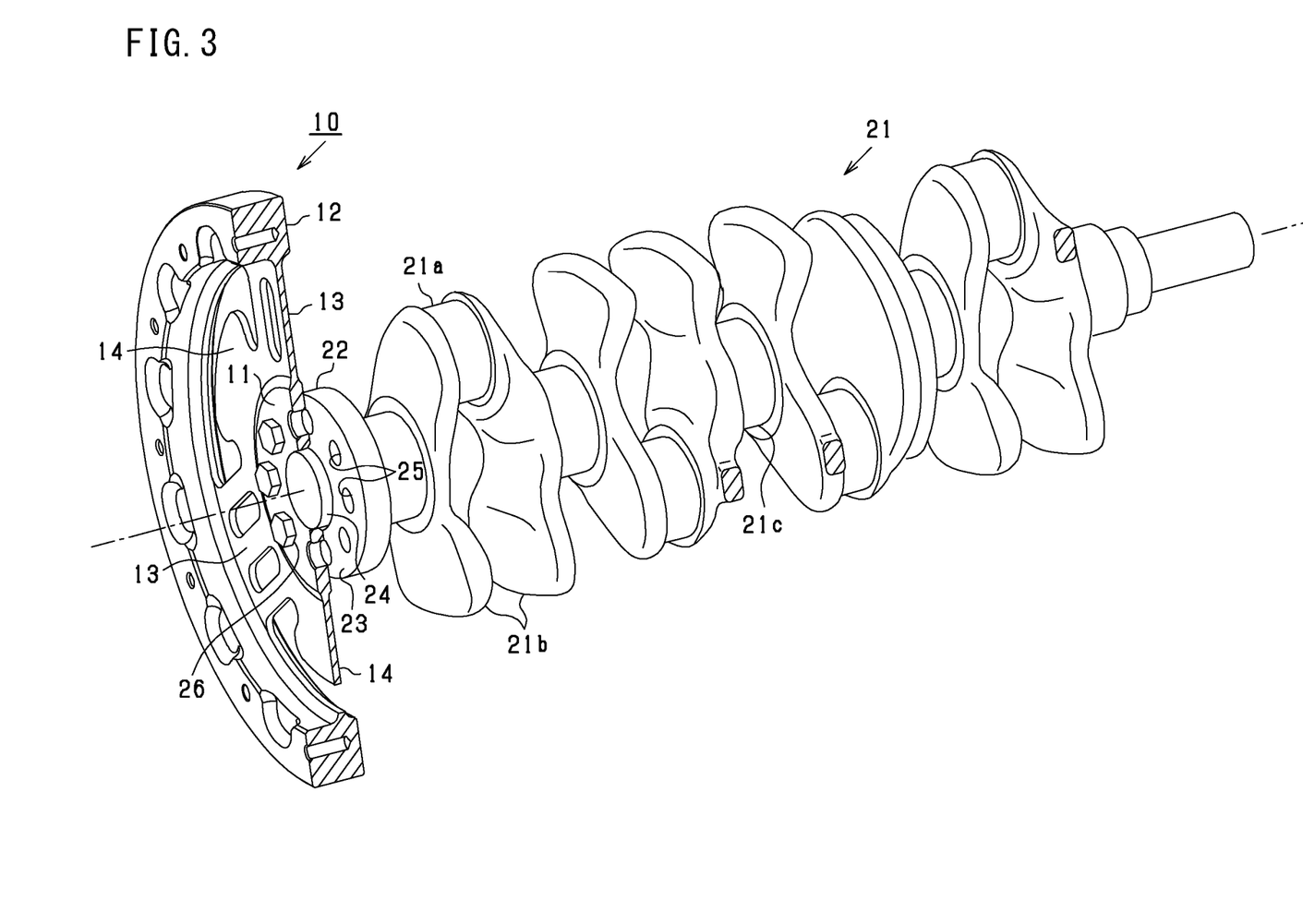
FIG. 3 is a perspective view showing a state in which the flexible flywheel is attached to a crankshaft.

As shown in FIG. 3, the shaft fastening portion 11 is fastened to a front end portion of a crankshaft 21. As shown in FIG. 1, the shaft fastening portion 11 is formed into the shape of a circular plate and is provided at the center of the flexible flywheel 10. As shown in FIG. 3, when the shaft fastening portion 11 is attached to the crankshaft 21, the shaft fastening portion 11 comes into contact with an end surface 23 of a counterpart fastening portion 22 provided at the end portion of the crankshaft 21.

As shown in FIG. 1, a positioning hole 31 is provided at the center of the shaft fastening portion 11. When the shaft fastening portion 11 comes into contact with the end surface 23 of the counterpart fastening portion 22 of the crankshaft 21, as shown in FIG. 3, a front end protrusion 24 provided on the end surface 23 is inserted into the positioning hole 31. As a result, the flexible flywheel 10 is positioned so that the rotational center axis of the crankshaft 21 and the rotational center axis of the flexible flywheel 10 coincide with each other.

As shown in FIG. 1, a plurality of bolt insertion holes 32 are annularly provided around the positioning hole 31. As shown in FIG. 3, bolt holes 25 corresponding to the bolt insertion holes 32 are provided in the counterpart fastening portion 22 of the crankshaft 21. In a state in which the front end protrusion 24 of the crankshaft 21 has been inserted into the positioning hole 31, the bolt insertion holes 32 are aligned with the bolt holes 25. Bolts 26 are screwed into the bolt holes 25, whereby the shaft fastening portion 11 is fastened to the counterpart fastening portion 22. As a result, the flexible flywheel 10 is fixed to the crankshaft 21.

As shown in FIG. 1, the inertia ring 12 is formed into an annular shape. When the flexible flywheel 10 rotates, the inertia ring 12 serves as an inertia mass, and a relatively large moment of inertia is attained due to its weight. Screw holes 33 are formed in the inertia ring 12. A damper (not shown) is attached by using the screw holes 33. Notably, the damper is provided optionally.

Figure 2:
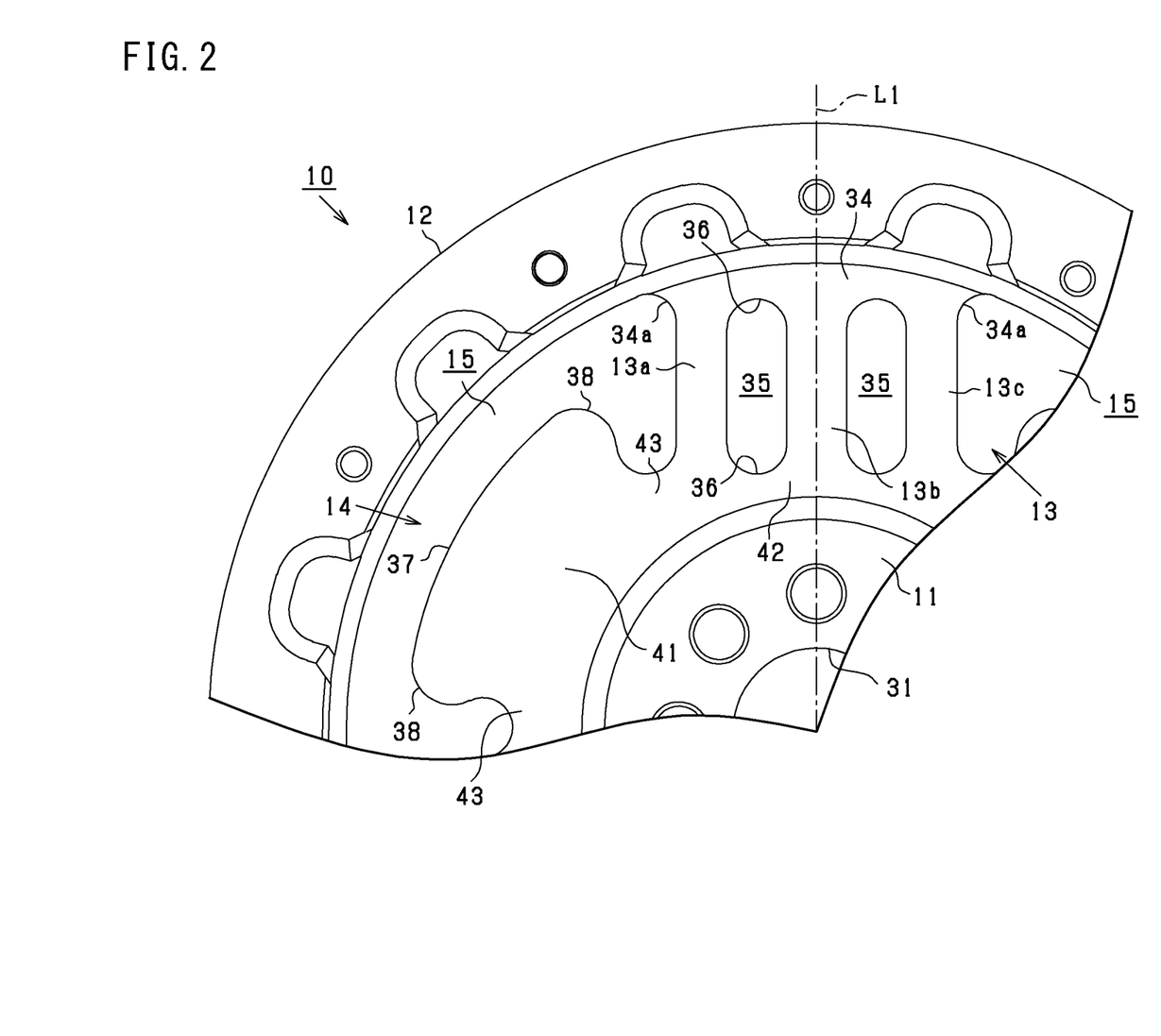
FIG. 2 is an enlarged view of a portion of FIG. 1.

The elastic spoke portions 13 extend, in the radial direction of the flexible flywheel 10, between the shaft fastening portion 11 and the inertia ring 12 and connect the shaft fastening portion 11 and the inertia ring 12 to each other. As shown in FIG. 2, the elastic spoke portions 13 are formed to be wide. In each elastic spoke portion 13, side edges 34a of an outer connecting portion 34 provided for connection to the inertia ring 12 are formed to have a rounded shape so that the side edges 34a are concave inward.

As shown in FIG. 3, the elastic spoke portions 13 are formed to be thinner than the shaft fastening portion 11. By virtue of deflection of the elastic spoke portions 13, a vibration attenuation effect is attained, and the flywheel is made flexible. Although the thickness of the elastic spoke portions 13 is arbitrarily determined, the thickness is set to, for example, 2 mm to 5 mm. Therefore, as compared with a plate portion of a flywheel not intended to attain such a vibration attenuation effect, the planar stiffness of the elastic spoke portions 13 is reduced, whereby the elastic spoke portions 13 become more likely to deflect.

As shown in FIG. 1, three elastic spoke portions 13 are provided and have the same structure. The three elastic spoke portions 13 are disposed at equal intervals in the circumferential direction of the flexible flywheel 10. In a front view, imaginary lines L1 to L3 which connect the widthwise centers of the elastic spoke portions 13 and the center of the flexible flywheel 10 are supposed. In this case, the angle between adjacent ones of the imaginary lines L1 to L3 is set to 120 degrees. Three spaces 15, each located between adjacent ones of the elastic spoke portions 13, are formed.

Each elastic spoke portion 13 has two elongated holes 35 formed therein. The elongated holes 35 are through holes and have the same shape and dimensions. The elongated holes 35 extend along a direction in which the elastic spoke portion 13 extends. Of opposite end portions of each elongated hole 35 in its longitudinal direction, a first end portion on the side toward the shaft fastening portion 11 is located near the shaft fastening portion 11, and a second end portion on the side toward the inertia ring 12 is located near the inertia ring 12. As shown in FIG. 2, each of inner edges 36 at these end portions is formed to have a rounded shape.

As shown in FIG. 2, since two elongated holes 35 are formed in each elastic spoke portion 13, the elastic spoke portion 13 is divided into three narrow spoke portions 13a to 13c. Of these narrow spoke portions 13a to 13c, the center narrow spoke portion 13b is located on the above-described imaginary line L1, L2, or L3 passing through the widthwise center of the elastic spoke portion 13 and extends along the direction in which the elastic spoke portion 13 extends. The narrow spoke portions 13a and 13c on opposite sides are provided to be parallel to the center narrow spoke portion 13b.

As shown in FIG. 1, the weight portions 14 are provided in all the three spaces 15, each of which is located between adjacent ones of the elastic spoke portions 13. One weight portion 14 is provided in each space 15, and the weight portions 14 have the same structure. The weight portions 14 are connected to the shaft fastening portion 11. Meanwhile, the weight portions 14 are not connected to the inertia ring 12 and are spaced from the inertia ring 12. On a side opposite each weight portion 14 with respect to the shaft fastening portion 11, one elastic spoke portion 13 is provided. The weight portion 14 is provided on an extension line of the center narrow spoke portion 13b.

As shown in FIGS. 1 and 3, the weight portions 14 are formed to have the shape of a flat plate and have the same thickness as the elastic spoke portions 13. As shown in FIG. 1, the weight portions 14 are formed to be wide in the circumferential direction of the inertia ring 12 in the front view. Each weight portion 14 is line-symmetrical with respect to an extension line obtained by extending the imaginary line L1, L2, or L3 passing through the center of a corresponding one of the elastic spoke portions 13. Each weight portion 14 is connected to the shaft fastening portion 11 over a wide range in the circumferential direction.

As shown in FIG. 2, an outer edge 37 of each weight portion 14 is formed to have the shape of an arc whose curvature is the same as that of the inertia ring 12. Each of side edge portions 38 on opposite sides of each weight portion 14 in the circumferential direction is formed to have an S-like shape. A weight connecting portion 41, which is a connecting portion of each weight portion 14 provided for connection to the shaft fastening portion 11, and an inner connecting portion 42, which is a connecting portion of each elastic spoke portion 13 provided for connection to the shaft fastening portion 11, are joined together by a joining portion 43. The joining portion 43 is formed to have a rounded shape which is concave toward the center of the shaft fastening portion 11. Outer edge portions of the joining portions 43 located on opposite sides of each weight connecting portion 41 in the circumferential direction also serve as side edges of the weight connecting portion 41 on opposite sides in the circumferential direction. Similarly, outer edge portions of the joining portions 43 located on opposite sides of each inner connecting portion 42 in the circumferential direction also serve as side edges of the inner connecting portion 42 on opposite sides in the circumferential direction.

As shown in FIG. 3, the flexible flywheel 10 having the above-described structure is connected to an end portion of the crankshaft 21. FIG. 3 shows an example of the state of connection. A crank pin 21a closest to the flexible flywheel 10 is supported by crank arms 21b. The flexible flywheel 10 is attached to the crankshaft 21 in such a manner that, in a state in which the crank arms 21b are disposed at a position where the crank arms 21b protrude from crank journals 21c in a 12 o'clock direction, the direction in which the crank arms 21b extend coincides with the direction in which one of the elastic spoke portions 13 extends. Explosion vibration at a point in time when the crank arms 21b start to rotate from a 12 o'clock position is the largest, and it is expected that the flexible flywheel 10 receives its influence. In view of this, the above-described connection state is employed. The bolt insertion holes 32 of the shaft fastening portion 11 and the bolt holes 25 of the counterpart fastening portion 22 are disposed so as to enable such attachment.

Notably, the state of connection between the crankshaft 21 and the flexible flywheel 10 may be changed. In some engines, the largest explosion vibration is generated at a point in time when the crank arms 21b start to rotate from a position different from the 12 o'clock position. The flexible flywheel 10 may be attached to the crankshaft 21 in consideration of the deviation of the angular position in such a manner that the direction in which one of the elastic spoke portions 13 extends coincides with, for example, a 10 o'clock position or a 2 o'clock position.

Next, an action in the case where the above-described flexible flywheel 10 is used will be described.

When the crankshaft 21 rotates, a moment of inertia is produced by the inertia ring 12. As a result, stable rotational motion of the crankshaft 21 is attained. When the crankshaft 21 vibrates due to drive of the engine, that vibration is transmitted to the shaft fastening portion 11 of the flexible flywheel 10. When the vibration is further transmitted to the elastic spoke portions 13, the elastic spoke portions 13 elastically deform, and absorb and attenuate the vibration. As a result, the crankshaft 21 is prevented from vibrating and can rotate stably.

The flexible flywheel 10 is attached to the crankshaft 21 in such a manner that, when the crank arms 21b are disposed at the 12 o'clock position, one of the elastic spoke portions 13 extends in the same direction as the crank arms 21b. Under the assumption of the present embodiment, the largest vibration is applied to the flexible flywheel 10 at the time when the crank arms 21b start to rotate from that position. Explosion vibration from the crank arms 21b is received by the elastic spoke portions 13 with stiffness but not the spaces 15, and the vibration is absorbed by the elastic spoke portions 13. As a result, a higher vibration attenuation effect is exhibited for explosion vibration, which is the largest vibration among vibrations applied from the crankshaft 21.

In addition, as viewed in the direction in which each elastic spoke portion 13 extends, a weight portion 14 is provided on a side opposite the elastic spoke portion 13 with respect to the shaft fastening portion 11. When the crankshaft 21 vibrates, due to the vibration, the weight portions 14 are shaken. Therefore, the vibration of the crankshaft 21 can be absorbed also by shaking of the weight portion 14. As a result, the vibration of the crankshaft 21 can be absorbed, on both sides of the crankshaft 21, by the elastic spoke portions 13 and the weight portions 14.

In conclusion, the flexible flywheel 10 of the present embodiment yields the following actions and effects.

(1) The elastic spoke portions 13 of the flexible flywheel 10 are formed to be thin and are formed to have a reduced planar stiffness so that the elastic spoke portions 13 easily deflect. When a vibration occurs in the crankshaft 21, that vibration is absorbed by deflection of the elastic spoke portions 13. As a result, the vibration of the crankshaft 21 can be attenuated. In the conventional flexible flywheel, the elastic disk is a component different from the inertia ring, and these members are fastened together. In contrast, the elastic spoke portions 13 are integrally formed by casting together with the shaft fastening portion 11 and the inertia ring 12. Therefore, the flexible flywheel 10 is composed of a single component, and a fastening operation of uniting a plurality of components is unnecessary. Thus, it is possible to reduce production cost while maintaining the vibration attenuation function.

(2) The flexible flywheel 10 includes three elastic spoke portions 13, and the weight portions 14 connected to the shaft fastening portion 11 are provided in the spaces 15, each of which is located between adjacent ones of the elastic spoke portions 13. When the crankshaft 21 vibrates, the weight portions 14 are shaken by the vibration. Therefore, the vibration of the crankshaft 21 can be absorbed by the shaking of the weight portions 14. Since the vibration of the crankshaft 21 is absorbed by both the elastic spoke portions 13 and the weight portions 14, the vibration can be attenuated further.

The weight portions 14 are also integrally formed by casting together with the shaft fastening portion 11, etc. Therefore, presence of the weight portions 14 neither causes an increase in the number of components nor requires an additional fastening work. Thus, it is possible to enhance the vibration attenuation effect, while reducing production cost, without increasing the number of components or the number of working steps.

In addition, in the present embodiment, each weight portion 14 is provided on an extension line of the imaginary line L1, L2, or L3 located on the widthwise center of a corresponding one of the elastic spoke portions 13. Therefore, the shaft fastening portion 11 is located between one elastic spoke portion 13 and one weight portion 14 when viewed along each of the imaginary lines L1 to L3. Therefore, absorption and restriction of vibration are performed on both sides of the crankshaft 21, whereby the effect of attenuating the vibration of the crankshaft 21 can be enhanced.

(3) The weight connecting portion 41, which is a connecting portion of each weight portion 14 provided for connection to the shaft fastening portion 11, and the inner connecting portion 42, which is a connecting portion of each elastic spoke portions 13 provided for connection to the shaft fastening portion 11, are joined together by a corresponding one of the joining portions 43. The joining portions 43 are formed to have a rounded shape. The outer connecting portion 34, which is a connecting portion of each elastic spoke portion 13 provided for connection to the inertia ring 12, has the side edges 34a which are located on opposite sides of the outer connecting portion 34 in the circumferential direction and are rounded.

Since each joining portion 43 has a rounded shape, each weight connecting portion 41 has recessed side edges (i.e., each weight portion 14 has a narrow portion). By virtue of this narrow portion, each weight portion 14 easily vibrates. Also, when the elastic spoke portions 13 and the weight portions 14 deflect for vibration absorption, stresses concentrate on the joining portions 43 and the outer connecting portions 34. Therefore, as a result of use of the flexible flywheel 10 over years, cracks may be generated in these portions. Since each joining portion 43 and the side edge portions 34a of each outer connecting portion 34 on opposite sides in the circumferential direction are formed to have a rounded shape, the concentration of stresses on these portions is mitigated, and the possibility of generating of cracks in these portions can be reduced.

(4) Each elastic spoke portion 13 has two elongated holes 35 which extend along the direction in which the elastic spoke portion 13 extends, whereby each elastic spoke portion 13 is divided into three narrow spoke portions 13a to 13c. Therefore, each elastic spoke portion 13 is lighter in weight and lower in planar stiffness than an elastic spoke portion in which a circular through hole(s) is formed or the elongated holes 35 are not formed. As a result, the elastic spoke portions 13 deflect more easily, whereby the effect of attenuating the vibration of the crankshaft 21 is enhanced.

Moreover, the first and second ends of the two elongated holes 35 located on opposite sides in the direction in which the elastic spoke portion 13 extends are located near the shaft fastening portion 11 and the inertia ring 12, respectively. Each of the inner edges 36 at these end portions is formed to have a rounded shape. Therefore, a plurality of portions each having a rounded shape are provided inward of the inner connecting portion 42 of each elastic spoke portion 13 and inward of the outer connecting portion 34 of each elastic spoke portion 13. By virtue of this configuration, as compared with a structure in which a plurality of portions each having a rounded shape are not provided, stresses which act on these connecting portions 34 and 42 when the elastic spoke portions 13 deflect can be reduced.

Notably, the present invention is not limited to the flexible flywheel 10 of the above-described embodiment, and, for example, the following structures may be employed.

(a) In the above-described embodiment, the number of the elastic spoke portions 13 is three. Alternatively, as in the case of a flexible flywheel 52 shown in FIG. 4, the number of elastic spoke portions 53 may be set to four. The number of the elastic spoke portions 13 or 53 is arbitrary.

(b) In the above-described embodiment, the weight portions 14 are provided on the extension lines (on the extension lines of the imaginary lines L1 to L3) located on the widthwise centers of the elastic spoke portions 13. Alternatively, as in the case of the flexible flywheel 52 shown in FIG. 4, a structure in which the weight portions 14 are provided at positions deviated from the extension lines located on the widthwise centers of the elastic spoke portions 53 may be employed.

Figure 4:
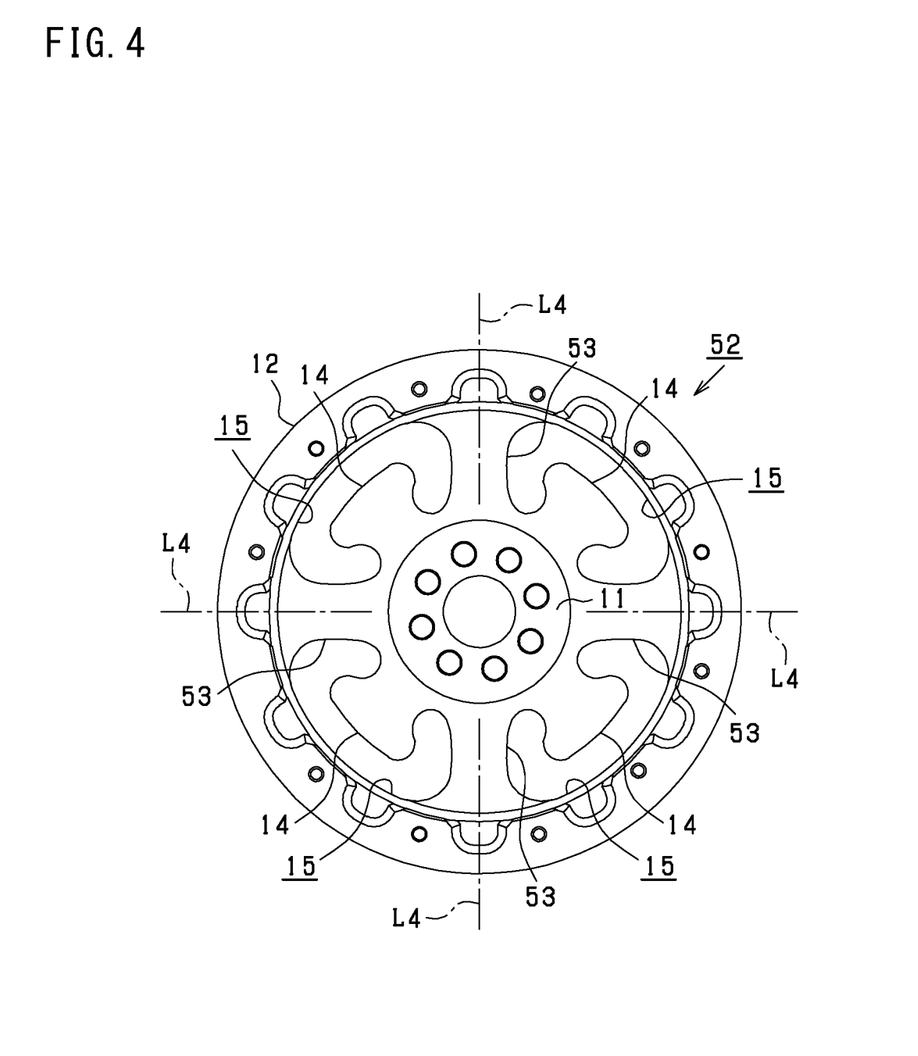
FIG. 4 is a front view showing another example of the flexible flywheel.

In the case where the weight portions 14 are provided at positions deviated from the extension lines located on the widthwise centers, it is preferred that, as shown in FIG. 4, the weight portions 14 are provided on opposite sides of each elastic spoke portion 53 in the circumferential direction, and the weight portions 14 on the opposite sides are line-symmetrical with respect to an imaginary line L4 passing through the widthwise center of the elastic spoke portion 53 and have the same shape. By virtue of this structure, as in the case of the above-described embodiment, the vibration of the crankshaft 21 can be equally absorbed on the left and right sides of the elastic spoke portion 53, whereby the vibration can be attenuated in a well balanced manner.

(c) In the above-described embodiment, a single weight portion 14 is provided in each space 15 located between the elastic spoke portions 13. Alternatively, a plurality of weight portions 14 may be provided in each space 15, or weight portions 14 may be provided in spaces 15 in such a manner that the number of weight portions 14 differs among the spaces 15. In a supposed case where a plurality of weight portions 14 are provided in each space 15, it is preferred that the plurality of weight portions 14 are disposed line-symmetrically with respect to the extension line of the imaginary line L1, L2, or L3 along which a corresponding one of the elastic spoke portions 13 extends. Even when this structure is employed, the same effect as the above-described embodiment can be attained.

Figure 5:
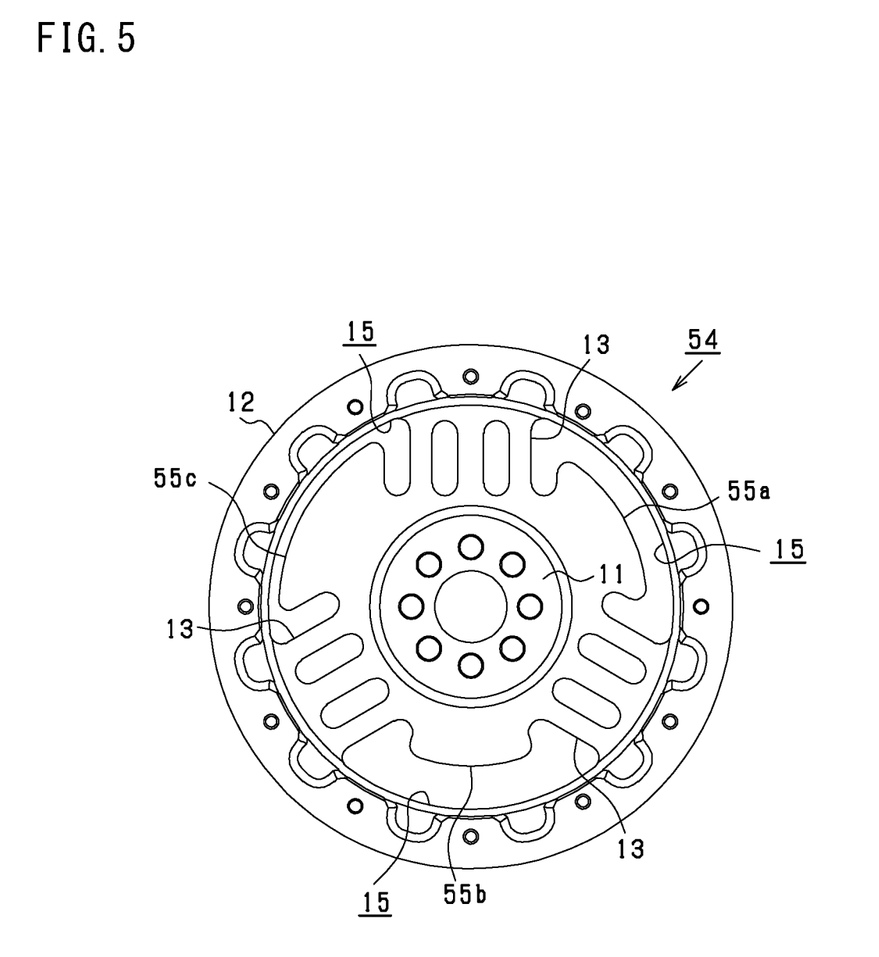
FIG. 5 is a front view showing another example of the flexible flywheel.

(d) In the above-described embodiment, the thickness of the weight portions 14 is the same as the thickness of the elastic spoke portions 13. Alternatively, the weight portions 14 may be formed to be thicker than the elastic spoke portion 13. Also, the three weight portions 14 are not required to be identical with one another in terms of shape, size, weight, etc., and, as in the case of a flexible flywheel 54 shown in FIG. 5, weight portions 55a to 55c which differ from one another in terms of shape, size, weight, etc. may be provided. By adjusting the weights, etc. of the weight portions 55, the natural frequency (resonance frequency) of the flexible flywheel 54 can be adjusted so as to attain an optimal vibration attenuation effect suitable for the vibration characteristics of the crankshaft 21 to which the flexible flywheel is attached.

Figure 6:
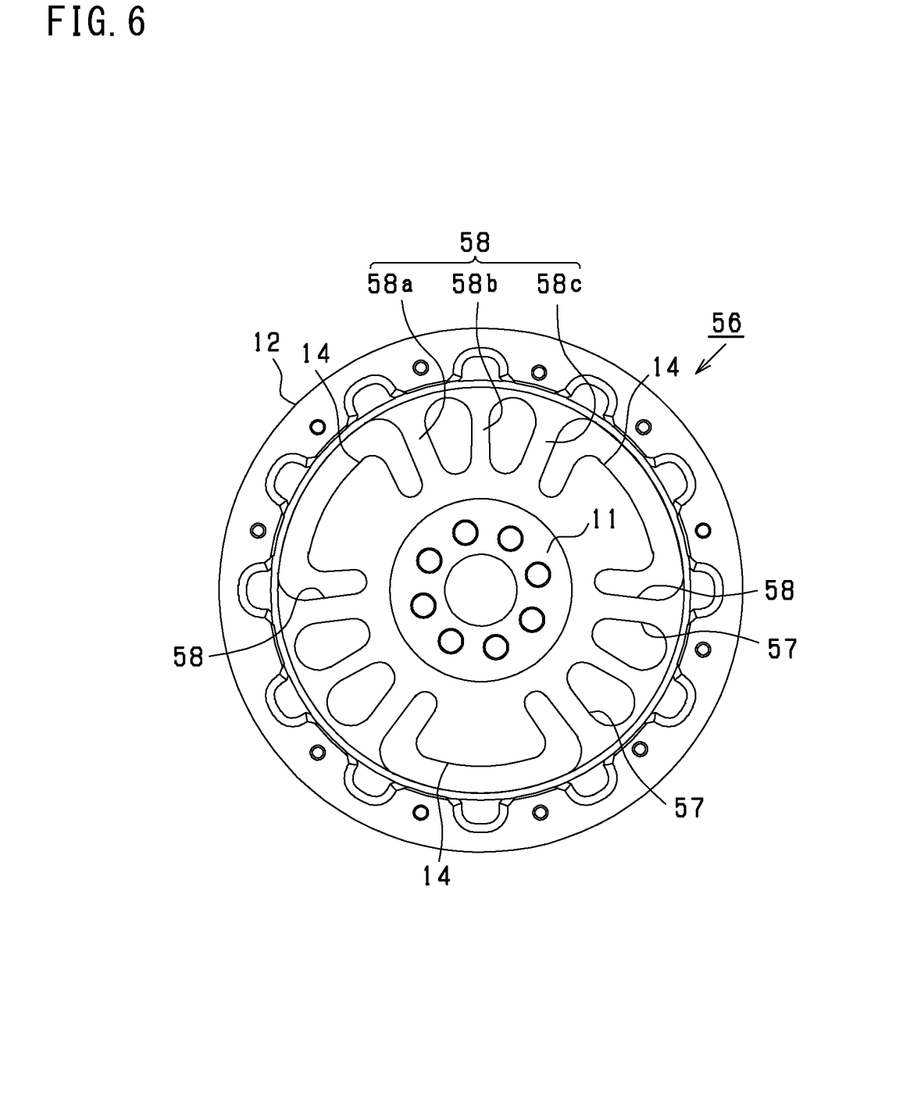
FIG. 6 is a front view showing another example of the flexible flywheel.

(e) In the above-described embodiment, the elongated holes 35 are formed in the elastic spoke portions 13. Alternatively, as in the case of the elastic spoke portion 53 shown in FIG. 4, the elongated holes 35 may be omitted. Also, instead of the elongated holes 35, a single through hole or a plurality of through holes having, for example, a circular shape or an elliptical shape may be formed, a teardrop shaped through holes 57 may be formed as shown in FIG. 6, or the elongated holes 35 and a through hole(s) having a different shape may be combined. Alternatively, the elongated holes 35 may be formed not to extend in the direction in which each elastic spoke portion 13 extends as in the above-described embodiment, but to extend in a direction intersecting that direction.

The number of the elongated holes 35 formed in each elastic spoke portion 13 is arbitrary. For example, a single elongated hole 35 may be formed, or three or more elongated holes 35 may be formed. The dimension of each elongated hole 35 in the direction of the major axis or the minor axis is arbitrary. For example, as compared with the elongated holes 35 of FIG. 1 in the present embodiment, each elongated hole 35 may have a larger dimension in the direction of the minor axis and/or a smaller dimension in the direction of the major axis.

(f) In the above-described embodiment, each elastic spoke portion 13 is divided into three narrow spoke portions 13a to 13c as a result of formation of the two elongated holes 35.

Each of the narrow spoke portions 13a to 13c extends in a radial direction in which the elastic spoke portion 13 extends. Alternatively, as in the case of a flexible flywheel 56 shown in FIG. 6, narrow spoke portions 58a to 58c of each elastic spoke portion 58 may be formed radially. Notably, in FIG. 6, the number of the narrow spoke portions 58a to 58c extending radially is three. However, the number of the narrow spoke portions is arbitrary.

Figure 7:
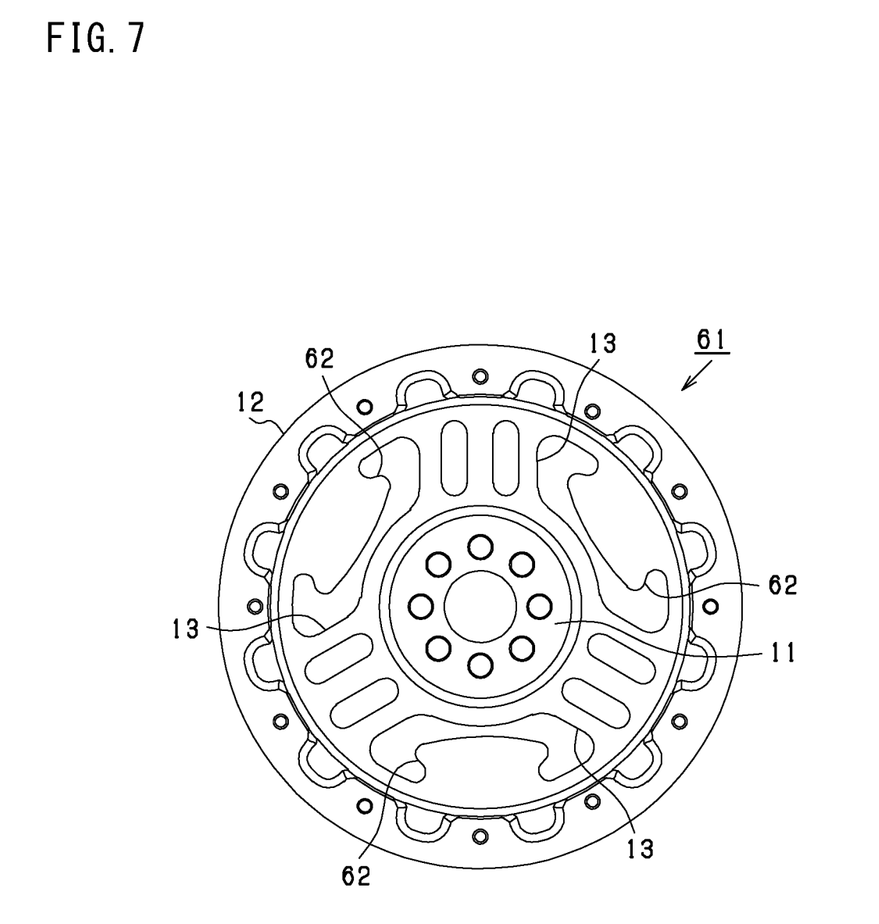
FIG. 7 is a front view showing another example of the flexible flywheel.

(g) In the above-described embodiment, although the weight portions 14 are connected to the shaft fastening portion 11, the weight portions 14 are not connected to the inertia ring 12 and are spaced from the inertia ring 12. In contrast, as in the case of a flexible flywheel 61 shown in FIG. 7, weight portions 62 may be provided in such a manner that, although the weight portions 62 are connected to the inertia ring 12, the weight portions 62 are not connected to the shaft fastening portion 11 and are spaced from the shaft fastening portion 11. In this case as well, an edge portion of each weight portion 62 on the side toward the shaft fastening portion 11 is formed to have an arc shape, and side edge portions on opposite ends in the circumferential direction are formed to have an S-like shape. Even when this structure is employed, as in the case of the above-described embodiment, when the crankshaft 21 vibrates, the vibration can be absorbed by shaking of the weight portions 62.

(h) In the above-describe embodiment, the shaft fastening portion 11, the inertia ring 12, the elastic spoke portions 13, and the weight portions 14 are integrally formed by casting. Alternatively, the present disclosure may be applied to a flexible flywheel in which all these elements are integrally formed by forging. Even when this structure is employed, effects identical with those of the above-described embodiment can be attained.

(i) In the above-describe embodiment, the internal combustion engine (engine) of a vehicle is assumed to be a rotating machine. The application of the present disclosure is not limited thereto. The present disclosure may be applied to, for example, a flywheel used in a press machine so long as the flywheel is used for the purpose of, for example, stabilizing rotation by utilizing moment of inertia or storing rotation energy.

The present disclosure has been described in conformity with examples but is not limited to the examples and the structures therein. The present disclosure encompasses a variety of variation examples and variations in the scope of equivalents of the present disclosure. In addition, a variety of combinations and forms and even other combinations and forms to which only one element or two or more elements are added fall within the scope and ideological range of the present disclosure.

DESCRIPTION OF REFERENCE NUMERALS

10: flexible flywheel, 11: shaft fastening portion, 12: inertia ring, 13: elastic spoke portion, 14: weight portion, 34: outer connecting portion, 34a: side edge, 35: elongated hole (through hole), 41: weight connecting portion, 42: inner connecting portion, 43: joining portion.

The invention claimed is:

1. A flexible flywheel comprising:
a shaft fastening portion having a ring shape with a round hole at a center of the shaft fastening portion for receiving an end portion of a shaft of a rotating machine;
an inertia ring having an annular shape and an inner diameter greater than an outer diameter of the shaft fastening portion and including an inner surface opposite a periphery of the shaft fastening portion;

a first spoke portion extending from a first portion of the periphery of the shaft fastening portion to a first portion of the inner surface of the inertia ring, the first spoke portion having flexibility and a thickness, measured in an axial direction of the shaft, smaller than a thickness of the inertia ring;

a second spoke portion extending from a second portion of the periphery of the shaft fastening portion to a second portion of the inner surface of the inertia ring, the second spoke portion having flexibility and a thickness, measured in the axial direction of the shaft, smaller than the thickness of the inertia ring;

a first weight portion protruding outward from a third portion of the periphery of the shaft fastening portion opposite from the first portion of the periphery of the shaft fastening portion and including a first distal end opposed to the inner surface of the inertia ring and separated from the inner surface of the inertia ring;

a second weight portion protruding outward from a fourth portion of the periphery of the shaft fastening portion opposite from the second portion of the periphery of the shaft fastening portion and including a second distal end opposed to the inner surface of the annular inertia ring and separated from the inner surface of the inertia ring;

a third spoke portion extending from a fifth portion of the periphery of the shaft fastening portion to a third portion of the inner surface of the inertia ring, the third spoke portion having flexibility and a thickness, measured in the axial direction of the shaft, smaller than the thickness of the inertia ring; and a third weight portion protruding outward from a sixth portion of the periphery of the shaft fastening portion opposite from the third portion of the periphery of the shaft fastening portion and including a third distal end opposed to the inner surface of the annular inertia ring and separated from the inner surface of the inertia ring, wherein the shaft fastening portion, the inertia ring, the first spoke portion, the second spoke portion, the first weight portion, and the second weight portion are integrally formed by casting or forging, the first spoke portion, the second spoke portion, the third spoke portion, the first weight portion, the second weight portion, and the third weight portion are separated from one another in the circumferential direction of the shaft fastening portion, the first weight portion is between the second spoke portion and the third spoke portion, the second weight portion is between the first spoke portion and the third spoke portion, and the third weight portion is between the first spoke portion and the second spoke portion.

2. The flexible flywheel according to claim 1, wherein
the first spoke portion, the second spoke portion, and the third spoke portion have shapes that are identical to one another and at equal intervals relative to the circumferential direction of the shaft fastening portion, the first weight portion, the second weight portion, and the third weight portion have shapes that are identical to one another, the first weight portion and the second weight portion are at the same distance from the third spoke portion in an opposite direction along the circumferential direction of the shaft fastening portion, the first weight portion and the third weight portion are at the same distance from the second spoke portion in an opposite direction along the circumferential direction of the shaft fastening portion, and the second weight portion and the third weight portion are at the same distance from the first spoke portion in an opposite direction along the circumferential direction of the shaft fastening portion.

3. The flexible flywheel according to claim 1, wherein
the first spoke portion includes a first inner joining portion that joins the first portion of the inner surface of the shaft fastening portion and a first outer joining portion that joins the first portion of the inner surface of the inertia ring, the second spoke portion includes a second inner joining portion that joins the second portion of the inner surface of the shaft fastening portion and a second outer joining portion that joins the second portion of the inner surface of the inertia ring, the third spoke portion includes a third inner joining portion that joins the fifth portion of the inner surface of the shaft fastening portion and a third outer joining portion that joins the third portion of the inner surface of the inertia ring, at least one of the first inner joining portion and the first outer joining portion includes side edges that have concave sections, at least one of the second inner joining portion and the second outer joining portion includes side edges that have concave sections, and at least one of the third inner joining portion and the third outer joining portion includes side edges that have concave sections.

4. The flexible flywheel according to claim 3, wherein
the first spoke portion includes first through holes,
the second spoke portion includes second through holes, and
the third spoke portion includes third through holes.

5. The flexible flywheel according to claim 4, wherein
the first through holes are elongated in a direction in which the first spoke portion extends, the first through holes include end edges that contact the first inner joining portion and end edges that contact the first outer joining portion, at least the edges that contact the first inner joining portion or at least the edges that contact the first outer joining portion are curved, the second through holes are elongated in a direction in which the second spoke portion extends, the second through holes include end edges that contact the second inner joining portion and end edges that contact the second outer joining portion, at least the edges that contact the second inner joining portion or at least the edges that contact the second outer joining portion are curved, the third through holes are elongated in a direction in which the third spoke portion extends, the third through holes include end edges that contact the third inner joining portion and end edges that contact the third outer joining portion, and at least the edges that contact the third inner joining portion or at least the edges that contact the third outer joining portion are curved.

6. The flexible flywheel according to claim 1, wherein
the first weight portion includes a first shaft joining portion that joins the third portion of the periphery of the shaft fastening portion, the second weight portion includes a second shaft joining portion that joins the fourth portion of the periphery of the shaft fastening portion, the third weight portion includes a third shaft joining portion that joins the sixth portion of the periphery of the shaft fastening portion, and the first shaft joining portion, the second shaft joining portion, and the third shaft joining portion include concave edges.

7. The flexible flywheel according to claim 1, wherein the first weight portion has a width measuring in the circumferential direction of the shaft fastening portion and a height measuring in a radial direction of the shaft fastening portion, the second weight portion has a width measuring in the circumferential direction of the shaft fastening portion and a height measuring in the radial direction of the shaft fastening portion, the third weight portion has a width measuring in the circumferential direction of the shaft fastening portion and a height measuring in the radial direction of the shaft fastening portion, the width of the second weight portion is less than the width of the first weight portion, the height of the second weight portion is less than the height of the first weight portion, the width of the third weight portion is greater than the width of the first weight portion, and the height of the third weight portion is greater than the height of the first weight portion.

8. A flexible flywheel comprising:

a shaft fastening portion having a ring shape and configured to be fastened with a shaft of a rotating machine;

an inertia ring having an annular shape and an inner diameter greater than an outer diameter of the shaft fastening portion and including an inner surface opposite a periphery of the shaft fastening portion;

a first spoke portion extending from a first portion of the periphery of the shaft fastening portion to a first portion of the inner surface of the inertia ring, the first spoke portion having a thickness, measured in an axial direction of the shaft, smaller than a thickness of the inertia ring;

a second spoke portion extending from a second portion of the periphery of the shaft fastening portion to a second portion of the inner surface of the inertia ring, the second spoke portion having a thickness, measured in the axial direction of the shaft, smaller than the thickness of the inertia ring;

a first weight portion protruding outward from a third portion of the periphery of the shaft fastening portion opposite from the first portion of the periphery of the shaft fastening portion and including a first distal end opposed to the inner surface of the inertia ring and spaced apart from the inner surface of the inertia ring;

a second weight portion protruding outward from a fourth portion of the periphery of the shaft fastening portion opposite from the second portion of the periphery of the shaft fastening portion and including a second distal end opposed to the inner surface of the annular inertia ring and spaced apart from the inner surface of the inertia ring;

a third spoke portion extending from a fifth portion of the periphery of the shaft fastening portion to a third portion of the inner surface of the inertia ring, the third spoke portion having a thickness, measured in the axial direction of the shaft, smaller than the thickness of the inertia ring; and a third weight portion protruding outward from a sixth portion of the periphery of the shaft fastening portion opposite from the third portion of the periphery of the shaft fastening portion and including a third distal end opposed to the inner surface of the annular inertia ring and spaced apart from the inner surface of the inertia ring, wherein the shaft fastening portion, the inertia ring, the first spoke portion, the second spoke portion, the first weight portion, and the second weight portion are formed as a single piece, the first spoke portion, the second spoke portion, the third spoke portion, the first weight portion, the second weight portion, and the third weight portion are spaced apart from one another in the circumferential direction of the shaft fastening portion, the first weight portion is between the second spoke portion and the third spoke portion, the second weight portion is between the first spoke portion and the third spoke portion, and the third weight portion is between the first spoke portion and the second spoke portion.

* * * * *